US010999257B2

(12) United States Patent
Chilakapati et al.

(10) Patent No.: US 10,999,257 B2
(45) Date of Patent: May 4, 2021

(54) SECURE DELIVERY AND STORAGE OF CONTENT

(71) Applicant: Amazon Technologies, Inc., Seattle, WA (US)

(72) Inventors: Ravi Kiran Chilakapati, Seattle, WA (US); Catalin Mihai Constantin, Seattle, WA (US); Francis Xavier Kearney, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 16/517,396

(22) Filed: Jul. 19, 2019

(65) Prior Publication Data

US 2019/0342271 A1 Nov. 7, 2019

Related U.S. Application Data

(63) Continuation of application No. 15/808,269, filed on Nov. 9, 2017, now Pat. No. 10,362,003, which is a continuation of application No. 14/520,215, filed on Oct. 21, 2014, now Pat. No. 9,819,648.

(51) Int. Cl.
*H04L 29/06* (2006.01)
*G06F 21/60* (2013.01)
*H04L 9/08* (2006.01)

(52) U.S. Cl.
CPC .......... *H04L 63/0428* (2013.01); *G06F 21/60* (2013.01); *H04L 9/0825* (2013.01); *H04L 63/045* (2013.01); *H04L 63/08* (2013.01); *H04L 63/10* (2013.01); *H04L 63/123* (2013.01); *H04L 63/168* (2013.01)

(58) Field of Classification Search
CPC . H04L 63/0428; H04L 9/0825; H04L 63/045; H04L 63/08; H04L 63/123; H04L 63/10; H04L 63/168; G06F 21/60
USPC .................................................. 713/165, 168
See application file for complete search history.

(56) References Cited

U.S. PATENT DOCUMENTS

| 6,728,379 | B1 | 4/2004 | Ishibashi et al. |
| 7,356,688 | B1 * | 4/2008 | Wang ..................... H04L 9/3013 380/277 |
| 7,366,915 | B2 | 4/2008 | Narin |
| 8,839,457 | B2 | 9/2014 | Harris et al. |
| 9,237,019 | B2 | 1/2016 | Roth et al. |

(Continued)

OTHER PUBLICATIONS

Arakawa et al., "WiFiTag: Direct Link from the Real World to Online Digital Contents," 2012 Seventh International Conference on P2P, Parellel, Grid, Cloud and Internet Computing, IEEE, Nov. 2012, 6 pages.

(Continued)

*Primary Examiner* — Jahangir Kabir
(74) *Attorney, Agent, or Firm* — Davis Wright Tremaine LLP

(57) ABSTRACT

A content item service enables users to upload media for content items to be given to others. The content item service performs operations on uploaded media content, such as transcoding. A transformed instance of content is encrypted using a cryptographic key, and an identifier for the encrypted transformed instance of content is generated. The encrypted transformed instance of content and an encrypted version of the cryptographic key are stored in association with the identifier.

20 Claims, 8 Drawing Sheets

(56) References Cited

U.S. PATENT DOCUMENTS

| | | | |
|---|---|---|---|
| 9,311,500 | B2 | 4/2016 | Roth et al. |
| 9,819,648 | B1 * | 11/2017 | Chilakapati ............. H04L 63/08 |
| 2002/0073102 | A1 | 6/2002 | Okamoto et al. |
| 2003/0110234 | A1 | 6/2003 | Egli et al. |
| 2004/0059913 | A1 | 3/2004 | de Jong |
| 2005/0277405 | A1 | 12/2005 | Noguchi |
| 2010/0142516 | A1 | 6/2010 | Lawson et al. |
| 2011/0277039 | A1 | 11/2011 | Harris et al. |
| 2012/0036365 | A1 | 2/2012 | Kyslov |
| 2012/0198022 | A1 | 8/2012 | Black et al. |
| 2012/0246462 | A1 | 9/2012 | Moroney et al. |
| 2013/0166906 | A1 | 6/2013 | Swaminathan et al. |
| 2015/0235011 | A1 | 8/2015 | Swaminathan et al. |
| 2015/0271232 | A1 | 9/2015 | Luby et al. |
| 2016/0366116 | A1 | 12/2016 | Swaminathan et al. |
| 2018/0278990 | A1 | 9/2018 | Rutland |

OTHER PUBLICATIONS

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

Song, et al., "Method of Social Network Service Based Media Contents sharing by Modified URL shortening," Advanced Communication Technology (ICACT), 2012 14th International Conference, IEEE, Apr. 2012, 5 pages.

U.S. Appl. No. 14/136,383, titled "Decoupled Content Delivery," filed Dec. 20, 2013.

* cited by examiner

SECURE DELIVERY AND STORAGE OF CONTENT

CROSS-REFERENCE TO RELATED APPLICATIONS

This application is a continuation of U.S. patent application Ser. No. 15/808,269, filed Nov. 9, 2017, entitled "SECURE DELIVERY AND STORAGE OF CONTENT," which is a continuation of U.S. patent application Ser. No. 14/520,215, filed Oct. 21, 2014, now U.S. Pat. No. 9,819,648, entitled "SECURE CONTENT DELIVERY," the disclosures of which are incorporated herein in their entirety.

BACKGROUND

The security of computing resources and associated data is of high importance in many contexts. As an example, organizations often utilize networks of computing devices to provide a robust set of services to their users. In many examples, users of such services are able to upload or otherwise provide sensitive information as part of utilizing such services. Users may, for instance, upload digital images, videos, and/or other content and enter personal information about themselves. Despite having provided such information, users often expect and, in some cases, regulations may require that a provider securely manage such information. However, computer systems that provide such services are often quite complex, often spanning multiple devices and even multiple geographic regions. Tasks involved in providing a service are often distributed among multiple sub-services for the purpose of scalability and efficiency. As a result, the management of data securely often involves management of security of multiple systems and the transfer of data among such systems.

BRIEF DESCRIPTION OF THE DRAWINGS

Various embodiments in accordance with the present disclosure will be described with reference to the drawings, in which.

DETAILED DESCRIPTION

Figure 1:
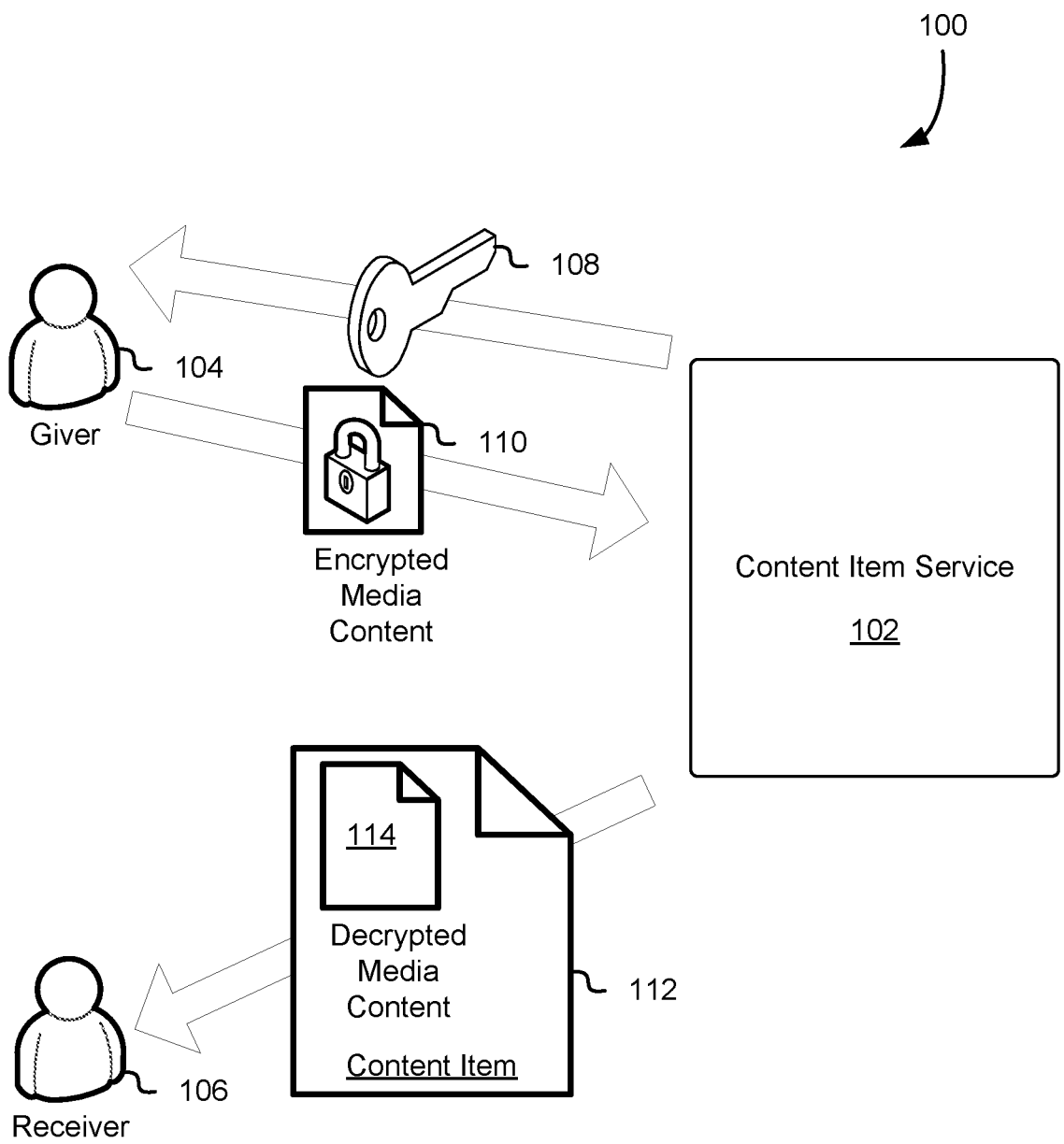
FIG. 1 shows an environment in which content items may be created and redeemed, in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein provide for the secure management of data in a service that allows for the giving and receiving of content items (also referred to as a "content item service"). In various embodiments, the service provides an interface through which users are able to design content items and direct the service to provide the content items to designated recipients. In some examples, the interface is one through which a mobile application is usable to design content items. In other examples, the interface is a website. In some embodiments, the content items are electronic gift cards which are collections of content organized according to a gift card metaphor. Unlike many traditional gift cards, however, content items of the present disclosure may comprise audio content, video content, textual content, digital images and/or other types of content. Some or all of the content in a content item may be supplied by a user (giver). As an example, a user may record audio and/or video of him/herself and upload the recorded content to the service for inclusion in a content item.

In many instances, the content provided by users of the service is of a personal nature and, to ensure that only intended people have access to the content, embodiments of the present disclosure utilize techniques to maintain security of user-provided content. In some embodiments, a user device utilizes a cryptographic key to encrypt content prior to transmitting the encrypted content to the content item service. The cryptographic key may be one generated by the service and transmitted to the user device over a secure (e.g., encrypted) communication channel. To enable the user device to provide the encrypted content to the service while, at the same time, preventing other devices from flooding the service with unauthorized content, the service may generate a pre-signed uniform resource locator (URL) which, in an embodiment, is a URL encoding a request to store data in a data storage system accessible to (e.g., part of) the content item service. The request may be digitally signed with a cryptographic key maintained as a secret by the service and shared with the data storage service such that, when the user device uses the URL to submit a request to upload content to the data storage service, the data storage service (e.g., a web server and/or an authentication system of the data storage service) can verify the digital signature of the URL to determine that fulfillment of the request is authorized by the service. The user device may use the pre-signed URL to add data (e.g., media content) to the request.

Once the encrypted content has been uploaded, the content is then processed by the content item service to enable a robust set of features of the content item service. In some examples, processing the encrypted content includes decrypting the encrypted content and transcoding the decrypted content. In some embodiments, the encrypted content is uploaded with an encrypted version of the cryptographic key that was used to encrypt the content. For example, the user device may encrypt the cryptographic key using a public cryptographic key of a public/private key pair associated with the content item service, where the private key of the public/private key pair is accessible to the service for decrypting the encrypted cryptographic key and thereby using the decrypted cryptographic key to decrypt the encrypted content for transcoding.

In some embodiments, the decrypted content is placed in a data storage location (e.g., in the data storage service) accessible to a transcoding workflow service that orchestrates performance of operations of a transcoding workflow. The transcoding workflow service may instruct a transcoding service to obtain the decrypted content from the data storage service or other system in which the decrypted data is stored (or, in other embodiments, obtain the decrypted content and provide the decrypted content to the transcoding service). The transcoding service, having obtained the decrypted content, may transcode the content to obtain one or more transcoded instances of the content. Once the transcoding workflow service determines that transcoding of the content has completed, the transcoding workflow service may retrieve the transcoded content from the data storage service (or other place in which the transcoded content is stored) and cause the transcoded content to be stored in an encrypted state. For example, the transcoding workflow service may transmit the transcoded content to the data storage service and instruct the data storage service to use server-side encryption (e.g., where the data storage service generates an encryption key, encrypts the transcoded content, encrypts the encryption key, and stores the encrypted encryption key with the encrypted transcoded content). In other embodiments, the transcoding workflow service encrypts the transcoded content itself, such as by using the cryptographic key noted above or another cryptographic key, and stores the encrypted transcoded content with an encrypted cryptographic key usable to decrypt the encrypted transcoded content.

To store the encrypted content, the transcoding workflow service may determine a suitable identifier for the encrypted transcoded content. For instance, the transcoding workflow service may determine an identifier (e.g., a URL or Uniform Resource Identifier (URI)) that is unlikely to be guessed and that is a member of a sparse space of identifiers. For instance, in some embodiments, an identifier for the encrypted transcoded content is determined as or otherwise based at least in part on output of a pre-image resistant function, such as a cryptographic hash function. The identifier may be used as an identifier for the encrypted transcoded content in the data storage service. In this manner, the encrypted transcoded content is unlikely to be discovered as a result of malicious or even inadvertent activity. The decrypted content that is stored in the data storage service may be deleted so as to not be persisted at rest in unencrypted form for longer than necessary.

Once the encrypted transcoded content is stored, the content item may be made available for redemption. In some examples, an entity specified by a giver of the content item (e.g., through a device interface) receives a message (e.g., electronic mail message, social network posting, push notification, or short message service (SMS) message) with a URL linking to the content item. As part of redemption of a content item, a receiver (e.g., designated recipient) of a content item may be provided with a URL that encodes a token. The URL may be provided, for instance, with the content item and the URL may be a link for a component of the content item. The token may comprise information that serves as an identifier for the encrypted transcoded content or that is otherwise usable to determine (e.g., by hashing the decrypted information) an identifier for the encrypted transcoded content. In some embodiments, an authorized component of the content item service may obtain a cryptographic key, and use the cryptographic key to hash the token to determine an identifier for a data storage location in which encrypted media is stored. Other variations are also considered as being within the scope of the present disclosure and, generally, the token comprises information that explicitly states or that, through processing, is usable to determine a data storage location of encrypted media. When a receiver device (i.e., a device of a user designated to receive the content item) transmits a request using the URL to a redemption frontend server, the server (or another system working in conjunction with the server) may use the URL to determine an identifier for the encrypted transcoded content. For instance, the server may process or otherwise cause to be processed the token. The processed token may result in determining the identifier or in information that may be input into a pre-image resistant function to determine the identifier. The identifier may be used to retrieve the encrypted transcoded content from the data storage service. A key may be obtained for decrypting the encrypted transcoded content and the transcoded content may then be streamed to the receiver device.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that f(x)-y is below a specified threshold), second pre-image resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different x1 and x2 is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

FIG. 1 shows an illustrative example of an environment 100 in which various embodiments can be implemented. As illustrated in FIG. 1 the environment 100 includes a content item service 102. As discussed in more detail below in connection with FIG. 2, the content item service 102 may be a computer system that performs various operations described herein for the purpose of providing content items. A content item may be a structured collection of instances of content, such as audio, video, text, and/or images. Content items are discussed in more detail in U.S. application Ser. No. 14/136,383, entitled "DECOUPLED CONTENT DELIVERY," filed Dec. 20, 2013, which is incorporated herein by reference.

In some examples the content item service 102 is a distributed computer system having multiple components that each perform different operations in the providing of services. In an embodiment, the content item service 102 provides an interface through which content items can be created using the services (i.e., sub-services) of the content item service 102. In some examples, the interface is a web interface through which hypertext transfer protocol (HTTP) requests may be submitted. For instance, as illustrated in FIG. 1, a giver 104 may communicate with the content item service 102 for the purpose of designing a content item and causing the content item service 102 to provide or otherwise make available a content item for redemption to a receiver 106. While HTTP is used throughout for the purpose of illustration, other protocols including, but not limited to, HTTP Secure (HTTPS) may be used for communications.

As discussed in more detail below in accordance with various embodiments, the content item service 102, as part of the process for designing a content item, provides a cryptographic key 108 to the giver 104. Note that, by providing the cryptographic key 108 to the giver 104, the content item service 102 may transmit the cryptographic key 108 to a device associated with the giver 104. Generally unless otherwise understood from context, operations described as involving (e.g., performed by) a giver 104 or receiver 106 are performed using a respective device. For example, the cryptographic key 108 may be transmitted by the content item service 102 to a mobile device associated with the giver 104. The mobile device may be, for example, a mobile phone or tablet computing device into which the giver 104 has input credentials into an input device such as a touchscreen to access the content item service 102 and/or other services associated with an entity that operates the content item service 102.

In various embodiments, the cryptographic key 108 is a symmetric cryptographic key which is used to encrypt information so as to be decryptable by the content item service 102. It should be noted, however, that various embodiments of the present disclosure may utilize asymmetric cryptographic algorithms instead of symmetric cryptographic algorithms. Note that a cryptographic key used to encrypt media content may be referred to as a "data key" or a variation thereof. For instance, in some examples, the giver 104 (i.e., a device associated with the giver 104) may use a public key of a public/private key pair to encrypt data that it sent to the content item service 102 where the public key corresponds to a private key held as a secret by the content item service 102 or another service associated therewith that operates at the direction of the content item service 102 such as a key management system that is separate from the content item service 102.

Turning back to the embodiment illustrated in FIG. 1, in an embodiment, when the giver 104 receives the cryptographic key 108, the giver 104 may encrypt media content using the cryptographic key 108 to generate encrypted media content 110 which is then transmitted from the giver 104 to the content item service 102. The content item service 102 may utilize the cryptographic key 108 to decrypt the encrypted media content 110 to perform various operations, such as transcoding as described in more detail below. In this manner, the giver 104 is able to securely transmit media content that is incorporated into a content item that the giver 104 designs using the content item service 102.

A receiver 106 of a content item 112 may interact with the content item service 102 through an interface provided by the content item service 102 for the purpose of redemption. Redemption may be performed in various ways in accordance with various embodiments. For example, in some examples the receiver 106 is notified that a content item has been prepared for the receiver 106. The notification may be made in various ways in accordance with various embodiments, such as in an electronic mail message, a posting in a social network environment, push notification, or a short message service (SMS) message. The content item provided from the content item service 102 to the receiver 106 may include decrypted media content 114 as a component of the content item 112.

While not illustrated with FIG. 1, the content item 112 may include additional components such as additional instances of decrypted media content and/or other information. The content item 112 may be provided with decrypted media content 114 to enable the receiver 106 to consume (e.g., view and/or listen to) the content item without access to the cryptographic key 108. Note, however, that while FIG. 1 shows decrypted media content 114 being provided from the content item service 102 to the receiver 106, the decrypted media content 114 may nevertheless be encrypted for transmission. For example, the decrypted media content 114 may be encrypted for transmission over a secure communications channel (e.g., a secure sockets layer (SSL) or transport layer security (TLS) session) that has been established between the receiver 106 and a server of the content item service 102.

Figure 2:
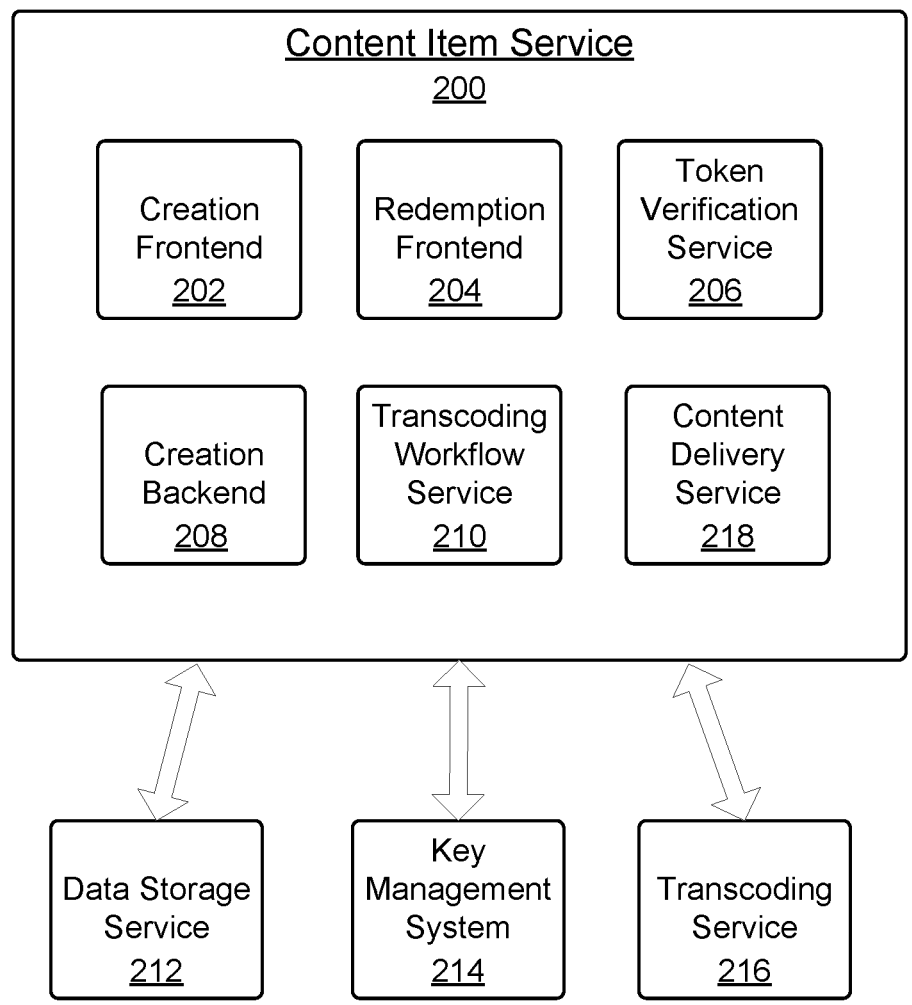
FIG. 2 shows an illustrative example of a content item service and other services that may interact with a content item service, in accordance with an embodiment.

FIG. 2 shows an illustrative example of a content item service 200 in accordance with an embodiment. As illustrated in FIG. 2, the content item service 200 includes numerous components forming a distributed system configured to provide content item services as described in more detail below. In an embodiment the content item service 200 includes a creation symmetric cryptographic key 202, a redemption symmetric cryptographic key 204, a token verification service 206, a creation backend 208, a transcoding workflow service 210, and a content delivery service 218. Note that the particular configuration of the content item service 200 is provided for the purpose of illustration and different configurations are considered as being within the scope of the present disclosure. For example, the content item service 200 may include different components than illustrated in FIG. 2. Further, while FIG. 2 shows an illustrative example of various components that may be part of the content item service 200, components may be combined in some embodiments. Further, the content item service 200 may include additional components such as other components illustrated in FIG. 2 and/or other components not explicitly mentioned herein or additional components not discussed herein.

In an embodiment with the creation frontend 202 is a computer system that provides an interface through which content items may be created. The creation frontend 202 may, for example, include one or more content item service frontend servers such as described in more detail below. Users of the content item service 200 may interact with the content item service (e.g., through a mobile application associated with the creation frontend 202 and/or a website configured with links for requests to be made by the creation frontend 202) to create content items through the creation frontend 202. For example, a mobile application, browser application or other application on a giver device of a giver utilizing the content item service 200, may transmit HTTP requests to the creation frontend 202 to cause the content item service to perform various operations, such as described in more detail below. In some embodiments, the creation frontend 202 provides access to a web page configured for management of content items and/or information consumable by a mobile application associated with the content item service 200.

The redemption frontend 204 may be a computer system configured to provide an interface for redemption of content items, such as described in more detail below. As with the creation frontend 202, the redemption frontend 204 may comprise one or more servers, such as one or more redemption frontend servers such as described in more detail below. A recipient of a content item using his or her device, may interact with the redemption frontend 204 for the purpose of receiving content items that have been created using the content item service 200. As an illustrative example, a receiver such as described above, may receive a uniform resource locator (URL) specific to a content item that has been gifted to the receiver. The receiver may select the URL to cause an application, such as a browser application, to retrieve the content item. Part of retrieval of the content item may include receiving a stream of decrypted media content, such as described in more detail below.

As discussed above, encryption may be used for the enhancement of security involving user provided media that is utilized in the content item service 200. In some examples, the token service 206 provides for the encryption of certain types of information as discussed in more detail below. Generally the token verification service 206 may be a computer system to which requests to verify tokens may be submitted for verification by the token verification service 206. Tokens verifiable by the token verification service 206 may be encrypted so as to be decryptable by a cryptographic key accessible to the token verification service 206. Example operations of the token verification service 206 are discussed in more detail below in connection with FIG. 4.

The creation backend 208 may comprise one or more application servers that perform various operations as part of the creation and management of content items by the content item service 200. For example, the creation backend 208 may orchestrate various operations by other services involved in the management of content items such as encryption/decryption data storage and the like.

The transcoding workflow service 210 may be a computer system comprising one or more servers configured to implement a transcoding workflow to transcode media provided by users of the content item service 200. In examples where media is video, the transcoded workflow service 210 may cause the video to be transcoded into one or more other file types. As an example, the video provided to the content item service 200 may use a particular resolution. The transcoding workflow service 210 may perform operations that cause the video to be transcoded to a lower resolution. Lower resolution may be used, for example, to enable a receiver of a content item to consume the content item without unnecessarily expending bandwidth resources. As another example, video provided to the content item service 200 from a user may be caused to be transcoded by the transcoding workflow service 210 to another file type. As discussed in more detail below, in some embodiments the transcoding workflow service 210 causes an instance of media content (e.g., an audio or video file) to be transcoded to multiple different transcoded files which may have different file types and/or resolutions. As an example, in some embodiments, the transcoding workflow service causes a video file to be transcoded to a thumbnail image and/or video (i.e., a smaller, lower-resolution file) so that a content item may be presented with the thumbnail and the thumbnail may be replaced by the larger corresponding file if so directed by a user through an interface (e.g., by selection of the thumbnail).

Figure 6:
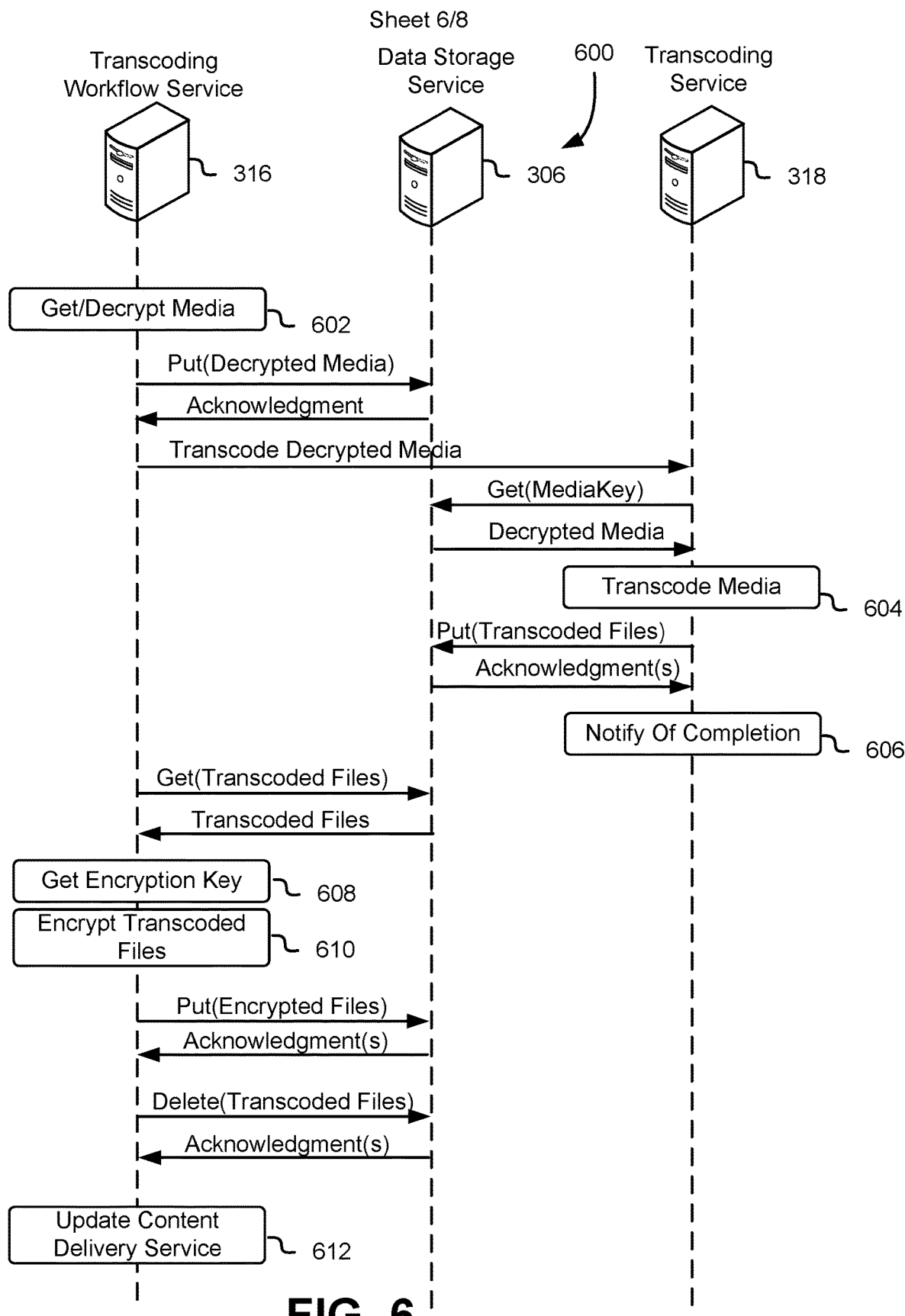
FIG. 6 shows a diagram illustrating communications between a transcoding workflow service, a data storage service and transcoding service in accordance with an embodiment.

The content delivery service 218 may be a computer system comprising one or more servers configured to provide notifications to receivers content items produced as part of performance of operations illustrated in FIG. 6 and other figures described above. The content delivery service may, for example, transmit an electronic mail message to an electronic mail account associated with the receiver or the electronic mail message may have been specified by the giver of a content item. Other ways of notifying the receiver may be used such as by a post on a social network, push notification, a short message service (SMS) message to a telephone number associated with the receiver and/or otherwise.

As illustrated in FIG. 2 the content item service 200 may interact with other services that are separate from the content item service 200 as part of performing its operations. As illustrated in FIG. 2 for example, the content item service 200 may interact with a data storage service 212 which may be a computer system (e.g., a distributed computer system) configured to receive and process data storage requests. Data storage requests may be, for example, requests to store data, requests to retrieve data and requests to delete data, among others. Data storage requests may also include requests related to the organization of data such as the creation of logical data containers (i.e., identifiers with which data objects can be associated to be stored "in" the logical data containers, which are often referred to as "buckets") and other management thereof.

The content item service 200 may also interact with a key management system 214 which may be a computer system configured to securely manage cryptographic keys. Key management system 214 may, for example, perform cryptographic operations on request and/or may provide cryptographic keys upon request as part of operations of the key management system 214. The key management system 214 may authenticate requests that are submitted to it for the purpose of security. For example, requests from the content item service 200 to the key management system 214 may be authenticated using digital signatures. In some embodiments, requests to the key management system 214 from the content item service 200 are digitally signed using a symmetric cryptographic key shared as a secret between the content item service 200 and the key management system 214 although other types of authentication are considered as being within the scope of the present disclosure.

As illustrated in FIG. 2, the content item service 200 may also interact with a transcoding service, which may be a computer system configured to perform transcoding operations for various types of media including audio files and video files. The transcoding service may be configured to fulfill requests received from the transcoding workflow service 210 to perform various operations. Transcoding operations include conversion to a different file type and/or changes in resolution, frame-rate, color scheme or other characteristics of media content. As discussed in more detail below, transcoded media files received from the transcoding service 216 to the content item service 200 may be stored in the data storage service 212.

As discussed, numerous variations are considered as being within the scope of the present disclosure, including variations wherein one or more of the data storage service 212, key management system 214 and transcoding service 216 are components of the content item service 200. The particular example illustrated in FIG. 2 is useful in numerous contexts such as when the data storage service 212, key management system 214 and/or transcoding service 216 are utilized by other services of a service provider that operates multiple services including the content item service 200. Use of such shared services provides the ability of reliance on the other services' infrastructure for the purpose of availability, scalability, and other advantages.

Figure 3:
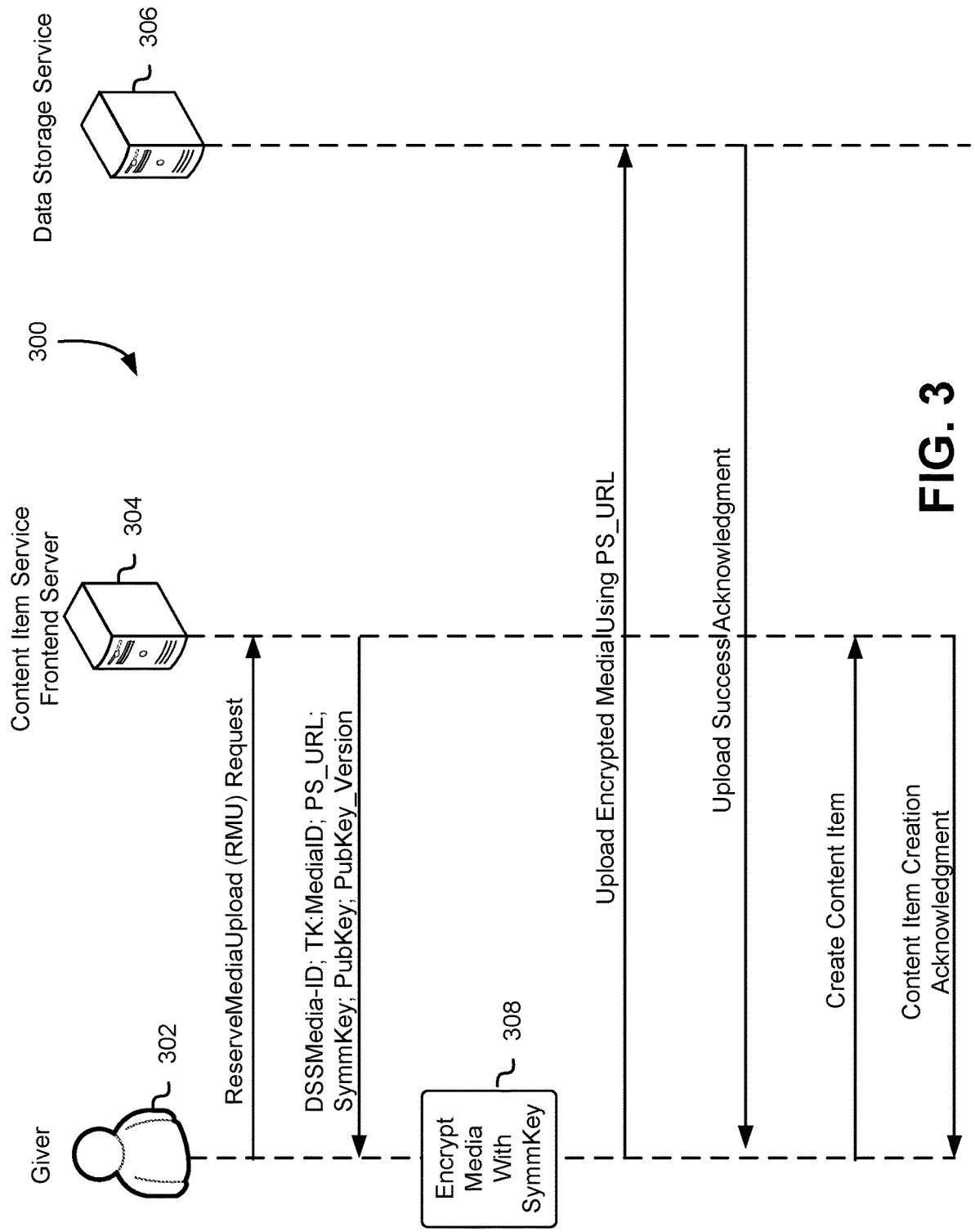
FIG. 3 shows a diagram illustrating communications between a giver of a content item, a content item service frontend server and a data storage service in accordance with an embodiment.

FIGS. 3-6 show illustrative diagrams of the flow of information in accordance with an embodiment in connection with the creation of a content item. Beginning with FIG. 3, a diagram 300 represents communications that may occur between a giver 302, a content item service frontend server 304 and a data storage service 306. The giver 302 may be such as described above in connection with FIG. 1. It should be noted that as with FIG. 1, while FIG. 3 shows the giver 302 interacting with the content item service frontend server 304, interactions of the giver 302 with the content item service frontend server 304 may occur via a device associated with the giver 302 such as a mobile device or tablet computing device operated by the giver 302. It should be understood that communications between the giver 302 and the content item service frontend server 304 are transmitted by such a device or any suitable device associated with the giver 302.

The content item service frontend server 304 may be a server that is part of the content item service 200 described above in connection with FIG. 2. In some embodiments, for instance, the content item service frontend server 304 is a component of the creation frontend 202 of the content item service 200 described above. The content item service frontend server 304 may be one server of a fleet of servers of the creation frontend 202 of the content item service 200. As with any server that may be part of a fleet of redundant servers of a service, interaction between the giver 302 and the content item service frontend server 304 may be via a load balancer that distributes requests among the fleet of servers.

The data storage service 306 may be the data storage service 212 described above in connection with FIG. 2 or generally any system which may be a distributed system configured to receive and process data storage requests.

Turning to the communications illustrated in FIG. 3, an embodiment of the giver 302 transmits a ReserveMediaUpload (RMU) request to the content item service frontend server 304. The ReserveMediaUpload (RMU) request may be for example an HTTP request transmitted by a device of the giver 302 to the content item service frontend server 304 over a network such as the Internet. The ReserveMediaUpload request may be transmitted as a result of interaction of the giver 302 with an interface such as a mobile application or a web page associated with the content item service. For example, in some embodiments, selection of an item in the interface such as a button in the interface may cause the ReserveMediaUpload request to be transmitted. The content item service frontend server 304 may process the ReserveMediaUpload request at least in part by obtaining information for a response to the ReserveMediaUpload request. Example ways of obtaining such information are described in more detail below. Briefly, fulfillment of the ReserveMediaUpload request involves determining an identifier for a data object to be uploaded to the data storage service. In an embodiment, the content item service frontend server determines a data storage service MediaID, a MediaID token (TK:MediaID), a pre-signed URL (PS_URL), a symmetric cryptographic key (SymmKey), a public key (PubKey) of a public/private key pair and a public key version (PubKey_Version) for the public key. Details of how the various information is obtained by the content item service frontend server 304 are discussed in more detail below. In an embodiment, the data storage service 306 operates as a key value store. The digital storage service MediaID (DSSMediaID) may be a key usable to identify a data object to be stored by the data storage service. The data storage service MediaID may be a key usable to determine a data storage location of the data storage service. In some embodiments, the data storage service MediaID is encoded in the form of a URL. The MediaID token, in an embodiment, is an encrypted set of information that includes a MediaID. The MediaID Token may be used by the frontend server and/or transcoding workflow service and/or another service to verify that the MediaID matches the MediaID token to ensure that media was uploaded to the correct data storage location.

The pre-signed URL in an embodiment is a URL with a digital signature of the URL where the digital signature of the URL has been generated using a cryptographic key of an entity with authority to cause the data storage service 306 to store data. In this particular example, the pre-signed URL may be a URL that encodes a request to store data where the digital signature was generated by an application server that shares a symmetric signing key with the data storage service 306 such that the data storage service 306 can receive a request submitted with the pre-signed URL, validate the digital signature and as a result of the digital signature being valid, determine to fulfill the request. In some examples, the pre-signed URL corresponds to a data storage location that is accessible to the transcoding service and inaccessible to some/all other services described herein. In other embodiments, the pre-signed URL corresponds to a data storage location that is accessible to the content item service (or a component thereof, such as the content item service backend server), but inaccessible to one or more other services. A pre-signed URL or other mechanism may be used (e.g., in a request to transcode, described below) to grant access to the data storage location to the transcoding service.

In some embodiment, the pre-signed URL encodes an expiration or other information determinative of a time at which the pre-signed URL becomes unusable to cause the request to be performed. The data storage service may be configured to reject the request if the pre-signed URL has become invalid due to the passage of time (or for another reason, such as revocation). The expiration or other information may be part of the data that is used to generate the digital signature of the pre-signed URL, thereby causing any modification to the expiration or other information to render the digital signature invalid for the pre-signed URL with the modified information. Note that, while a pre-signed URL is used for the purpose of illustration as a mechanism by which access to a non-public data storage location may be granted, variations are considered as being within the present disclosure. For example, a non-pre-signed URL (e.g., a conventional URL) may be provided to enable upload to a public data storage location (where temporary storage of decrypted data may be stored in a non-public data storage location).

Note that, while URLs (which specify how to access content, e.g., by specifying a protocol such as HTTP or File Transfer Protocol (FTP)) and URIs are used for the purpose of illustration, other references may be used. Generally, techniques described and suggested herein include uses of uniform resource locators (URLs) and other references to computing resources (generally "resource locators") to enable access to services of a service provider. While URLs are used throughout the present disclosure for the purpose of illustration, it should be understood that the techniques described herein are generally applicable to other resource locators (i.e., instances of information usable by a system to locate a computing resource within the system), such as general URIs. Moreover, the techniques described herein are generally applicable to electronic requests and are not limited to HTTP requests, which are used throughout for illustration.

The public key version may be information that identifies a version of the public key to enable selection of a corresponding private key. In some examples for instance, key pairs are rotated on a periodic or aperiodic basis and information encrypted using a particular public key may be persisted for a time during which the key pair is replaced by another key pair. By use of the public key version, the public key version may be stored with the encrypted data to enable selection of the private key from storage for the purpose of decryption. Note that, while a public key version is used for the purpose of illustration, other identifiers, such as public key identifiers may be used instead of or in addition to a public key version.

When the giver 302 receives the information from the content service frontend server 304, the giver 302 (i.e., a device associated with the giver 302) may encrypt 308 one or more instances of media using the symmetric cryptographic key using the symmetric cryptographic key received from the content item service frontend server 304. The one or more instances of media may comprise one or more audio files, one or more video files and/or generally any one or more other types of media content. Note that, in some embodiments, the giver 302 may generate or otherwise obtain a symmetric cryptographic key, use that cryptographic key for encryption, and may provide the cryptographic key to the content item service for use thereby.

In an embodiment, when the giver 302 encrypts 308 the media with the symmetric cryptographic key, the giver 302 may transmit the encrypted media to the data storage service 306 using the pre-signed URL. In an embodiment, the giver 302 uses the pre-signed URL to contact a domain name service (DNS) to determine an internet protocol (IP) address of a server of the data storage service 306. The user 302 may transmit the pre-signed URL to the data storage service 306 (by transmitting to the determined IP address) with the encrypted media. For example, in some embodiments, an application of the giver 302 is configured to generate (i.e., configured to cause the device of the giver to generate) a data object that comprises the encrypted media and the symmetric cryptographic key encrypted under the public key and the public key version and may provide the data object in a request that includes the pre-signed URL.

The data storage service 306, upon receiving such a request may access an appropriate cryptographic key to verify the pre-signed URL. To determine whether to fulfill the request when the data storage service 306 determines to fulfill the request, the data storage service 306 may transmit an acknowledgement of success of upload to the giver 302. Having received the acknowledgment of success from the data storage service 306, the giver 302 may transmit a request to create a content item using the encrypted media that was uploaded. The request to create the content item may be transmitted from the giver 302 to the content item service frontend server 304. The content item service frontend server 304 may perform one or more operations that cause the content item to be created, such as described in more detail below. The content item service frontend server 304 may transmit an acknowledgement of the content item creation to the giver 302. It should be noted that creation of the content item may be asynchronous relative to the acknowledgement of the content item creation transmitted from the content item service frontend server 304. For example, the transcoding of media may take an amount of time and, to enable a better user experience, the content item service frontend server 304 may initiate transcoding and before transcoding is finished transmit the acknowledgement. Should any errors occur, the giver 302 may be notified accordingly (e.g., through an electronic message).

Figure 4:
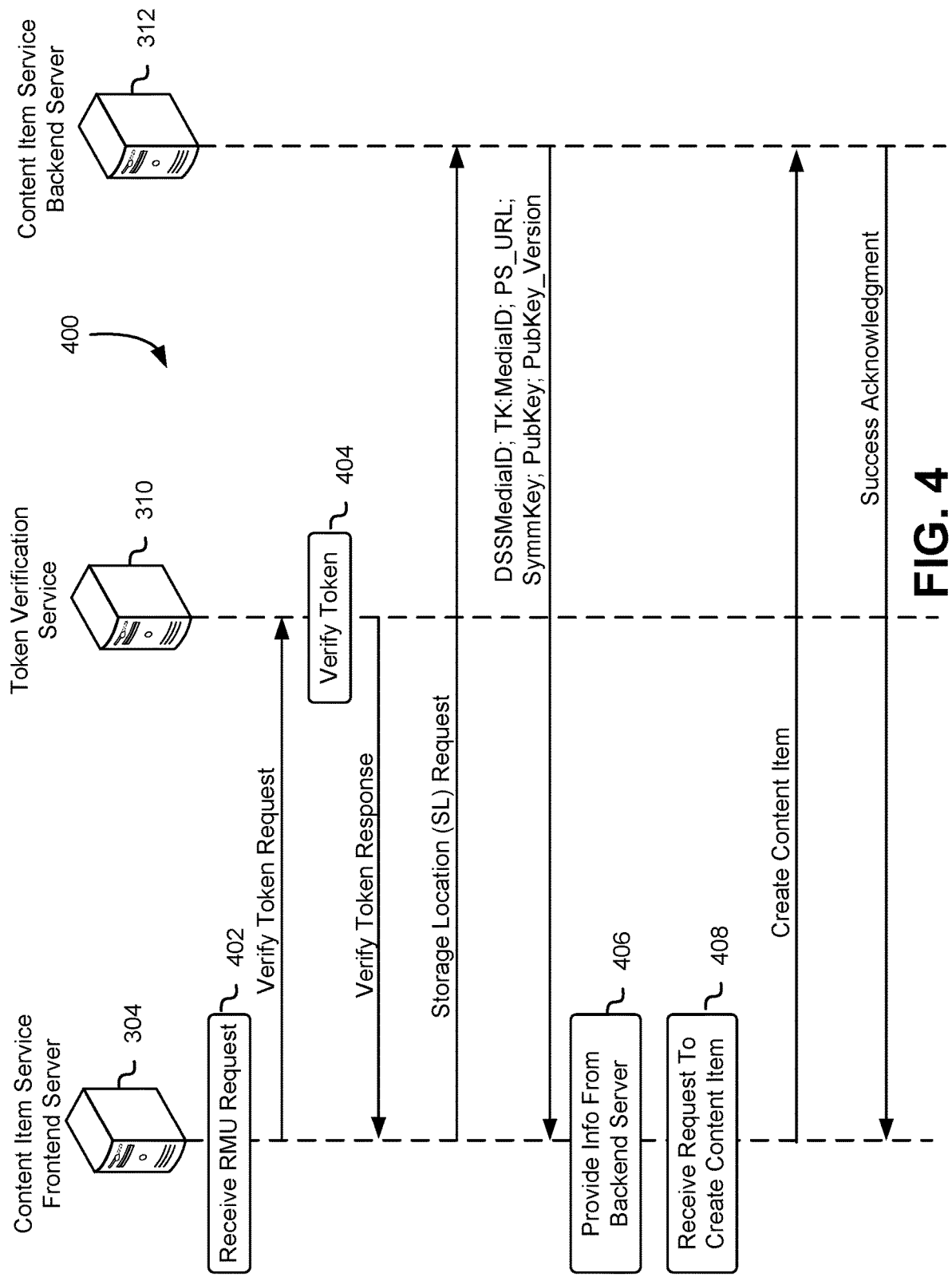
FIG. 4 shows a diagram illustrating communications between a content item service frontend server, a token verification service and a content item service backend server in accordance with an embodiment.

FIG. 4 shows a diagram 400 illustrating communications between a content item service frontend server 304 such as described above in connection with FIG. 3, a token verification service 310, such as the token verification service 206 described above in connection with FIG. 2, and a content item service backend server 312. The content item service backend server 312 may be a component of the creation backend 208 of the content item service 200 discussed above in connection with FIG. 2. In some embodiments, the content item service backend server 312 is a member of a fleet of servers of the content item service 200 (e.g., behind a load balancer) and specifically of the creation backend 208 described above.

Turning to the specific example of communications illustrated in FIG. 4, the content item service frontend server 304 may receive 402 a ReserveMediaUpload request such as described above in connection with FIG. 3. The ReserveMediaUpload request may be submitted with an authentication token that enables the content item service to determine how to process the ReserveMediaUpload request. For example, an application of the giver 302 described above in connection with FIG. 3 may obtain the authentication token as a direct or indirect result of having successfully performed an authentication process such as entry of a valid user name and password or another set of credentials that were verified by the content item service or another service which the content item service is configured to trust. To determine whether to fulfill the ReserveMediaUpload request, the content item service frontend server 304 may transmit the authentication token in a verify token request to the token verification service 310. The token verification service 310 may utilize a suitable cryptographic key such as a symmetric cryptographic key used to generate the authentication token to verify the token.

The token verification service may, for instance, decrypt the authentication token and analyze the decrypted information to determine whether the token is valid. Generally, any way by which an authentication token may be validated may be used. Upon having verified 404 the token, the token verification service 310 may transmit a verified token response to the content item service frontend server 304. Assuming successful validation of the token, the verified token response may indicate that the token was successfully verified and therefore that the content item service frontend server 304 should fulfill the reserved media upload request that was received 402. While not illustrated in FIG. 4, note that if the verified token response indicates that the token was not successfully validated either because the token was not valid or a malfunction of the token verification service 310, the content item service frontend server 304 may deny the reserved media upload request that was received 402.

Upon receiving a verified token response that indicates that the authentication token is valid, the content item service frontend server may, in response, transmit a storage location request to the content item service backend server 312. The storage location request may be a request such as a web service request configured to cause the content item service backend server 312 to determine (e.g., generate or otherwise cause to have generated) a data storage service MediaID, a MediaID token, a pre-signed URL, a symmetric cryptographic key, a public key and a public key version such as described above. To generate a pre-signed URL, the content item service backend server may generate a URL (or, generally, a request) and an electronic (digital) signature of a portion of the URL. The content item service backend server may fulfill the storage location request by providing in response to the storage location request the data storage service MediaID, the MediaID token, the pre-signed URL, the symmetric cryptographic key, the public key and the public key version to the content item service frontend server 304.

Example operations that may be performed by the content item service backend server 312 to determine the data storage service MediaID, the MediaID token, the pre-signed URL, the symmetric cryptographic key, the public key and the public key version are described in more detail below. It should be noted that while not illustrated in FIG. 4, other operations may also be performed such as validation of the storage location request by the content item service backend server 312 using a digital signature verification algorithm or otherwise. The information received in response to the storage location request may then be provided 406 from the content item service frontend server 304 to the giver that submitted the ReserveMediaUpload request 402.

At a time after having provided the information received from the content item service backend server 312 in response to the service location request, the content item service frontend server may receive 408 a request to create a content item from the giver that submitted the ReserveMediaUpload request that was received 402. The content item service frontend server 304 may verify that the MediaID matches the MediaID token (e.g., by decrypting or otherwise having decrypted the token and verifying that decrypted token contains the MediaID or another matching value) and, as a result of successful verification, cause the content item service backend server 312 to perform operations involved in creation of the content item. It should be noted that while FIG. 4 illustrates the same server receiving the ReserveMediaUpload request 402 and receiving the request to create the content item, the request may be received by different servers such as by different servers of the creation frontend 202 which may be servers that are configured for processing different types of requests or may be redundant servers in a fleet of redundant servers. Note that in various embodiments the content item service frontend server 304 is stateless so that different servers may receive and successfully process the ReserveMediaUpload request and the request to create a content item. For the purpose of simplicity of illustration, FIG. 4 illustrates the ReserveMediaUpload request being received 402 by the same server that receives the request to create the content item.

To fulfill the request to create the content item that was received 408 by the content item service frontend server 304, the content item service frontend server 304 may transmit a request to create the content item to the content item service backend server 312. The content item service backend server 312 may perform one or more operations that cause the content item to be created and made available to a receiver. The content item service backend server 312 may also transmit, in response to the request to create the content item received from the content item service frontend server 304, acknowledgement of success for creation of the content item. As discussed above, the acknowledgement of success of creation of the content item may be transmitted asynchronously relative to operations performed to create the content item such as transcoding. For example, the content item service backend server 312 may initiate transcoding operations and the acknowledgement may be transmitted to the content item service frontend server 304 prior to completion of the transcoding operations.

Figure 5:
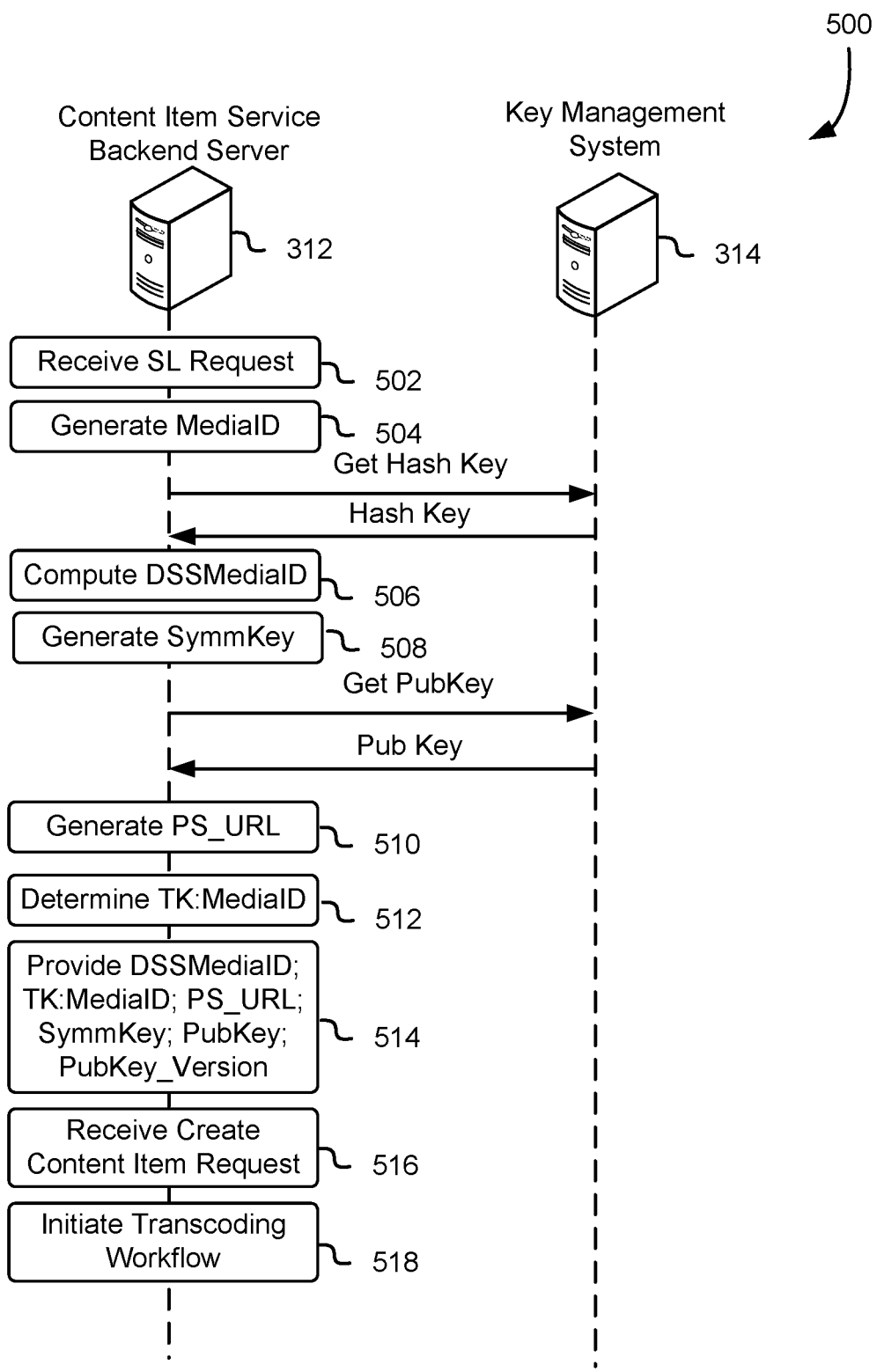
FIG. 5 shows a diagram illustrating communications between a content item service backend server and a key management system in accordance with an embodiment.

FIG. 5 shows a diagram 500 illustrating communications between a content item service backend server 312 and a key management service 314 such as described above. In an embodiment, the content item service backend server 312 receives 502 a storage location request. The storage location request may be received 502 from the content item service frontend server 304 such as described above in connection with FIG. 4. Upon determining to fulfill the service location request that was received 502, the content item service backend server 312 may generate 504 a MediaID. The MediaID may be a random number generated by a random number generator. The content item service backend server 312 may transmit a request to the key management system 314 to get a hash key. The key management system 314 may generate the hash key such as by using a random number generator and may provide the hash key in response to the request that was submitted from the content item service backend server 312. Note that, in some embodiments, the content item service backend server generates or accesses from memory a hash key itself. Once the content item service backend server 312 has obtained the MediaID and the hash key, the content item service backend server 312 may compute 506 a data storage service MediaID (DSSMediaID).

The data storage service MediaID may be generated in various ways in accordance with various embodiments. In some examples, the data storage MediaID is generated as or otherwise based at least in part on output of a one-way function, such as described above. In a specific example, the data storage service MediaID is computed 506 as a hash-based message authentication code (HMAC) of the hash key and the MediaID. Although other ways of generating a data storage service MediaID are considered as being within the scope of the present disclosure such as by using different functions such as other cryptographic hash functions or key derivation functions, and others.

The content item service backend server 312 may generate 508 a symmetric cryptographic key such as by using a random number generator and may transmit a request to get a public key from the key management system 314. The request to get the public key from the key management system 314 may specify an identifier of the public key explicitly or may provide information from which the key management system 314 is otherwise able to determine the public key to provide. For instance, the key management system 314 may be configured to associate the content item service with a set of public keys. The public key may be provided in response to the request that was received from the content item service backend server 312. The public key may be provided in various ways, such as by providing a digital certificate that encodes the public key. Other information, such as a public key version may also be provided.

In an embodiment, the content item service backend server 312 generates 510 a pre-signed URL. The pre-signed URL may be a URL that encodes a request to retrieve data identified by the data storage service MediaID. The URL may be digitally signed by the content item service backend server using a cryptographic key that is shared between the content item service backend server 312 and the data storage service or in some embodiments an authentication service that operates in conjunction with the data storage service but separately therefrom.

Once the pre-signed URL has been generated 510, the content item service backend server 312 may determine 512 a MediaID token. The MediaID token may be determined in various ways in accordance with various embodiments. In some examples, the content item service 200 described above in connection with FIG. 2 includes an additional component that operates as a service for tokenizing information in response to requests submitted to the service. The components may for example receive information, encrypt the information to generate a token and may provide the encrypted token in response. Such a service may utilize a cryptographic key for encryption that is inaccessible outside of the service or generally inaccessible to callers of the service. In other embodiments, the content item service backend server generates the MediaID token itself. The content item service backend server 312 may for example share a cryptographic key with other content item service backend servers such that each server may generate tokens itself. Other variations are also considered as being within the scope of the present disclosure.

Once the MediaID token has been determined 512, the content item service backend server 312 may provide 514 the data storage service MediaID token, the pre-signed URL, the symmetric cryptographic key, the public key and a public key version corresponding to the public key to the entity that submitted the service location request that was received 502 which, as discussed above, may be a content item service frontend server 304 such as described above.

At a point after providing the data storage service MediaID token, pre-signed URL, symmetric cryptographic key, public key and public key version, the content item service backend server 312 may receive 516 a create-content-item request. As discussed above, a different server than the one that received 502 the storage location request may receive 516 the create-content-item request and generally content item service backend servers 312 may be stateless to enable multiple content item service backend servers to fulfill requests without the need to submit different requests to the same server. The create-content-item request that is received 516 may be received from the entity that submitted the storage location request that was received 502 such as a content item service frontend server.

Once the create-content-item request has been received 516, the content item service backend server may initiate 518 a transcoding workflow. Other operations may also be performed by the content item service backend server 312 although such operations are not necessarily illustrated in FIG. 5. For example, an acknowledgement may be transmitted to the entity that submitted the create-content-item request that was received 516. Note that while FIG. 5 and generally other figures illustrate various operations, the order of operations that are performed may vary in accordance with various embodiments. Generally, embodiments within the scope of the present disclosure include those where the order of operations is different than illustrated and generally any suitable order is considered as being within the scope of the present disclosure. Generally, two operations may be performed in any order unless one of the two operations depends from the performance of the other.

FIG. 6 shows a diagram 600 illustrating communications between a transcoding workflow service 316, a data storage service 306 and a transcoding service 318. In an embodiment, the transcoding workflow service 316 obtains and decrypts media obtained 602 in response to a request to perform a transcoding workflow received from a content item service backend server as part of initiating a transcoding workflow such as described above. Note that, while FIG. 6 shows operations performed by the transcoding workflow service 316, additional components may be utilized. For example, the transcoding workflow service may operate in conjunction with a service integration layer that performs some or all operations described in as performed by the transcoding workflow service 316.

The request from the content item service backend server may include a storage location that the transcoding workflow service 316 can use to submit a get request (a request to retrieve data specified in the request by an identifier) to the data storage service described above in order to obtain encrypted media. The transcoding workflow service may use a private key to decrypt an encrypted symmetric cryptographic key that is stored with the encrypted media to obtain the symmetric cryptographic key to decrypt the encrypted media. The encrypted symmetric cryptographic key and the encrypted media may, for instance, be stored in a single data object (i.e., as a collection of data associated with the same identifier). Having decrypted 602 the media, the transcoding workflow service 316 may transmit a put request (a request to store data, the request including the data) to the data storage service 306 to cause the data storage service 306 to store the decrypted media. The put request may specify a data storage location utilized by the transcoding workflow service for the purpose of temporary storage of the decrypted media in the data storage service 306. The location (or locations) may be specifically created for the transcoded file, such as using output to a pre-image resistant function, such as described above. In some embodiments, the data storage service 306 organizes data objects into logical data containers (which may be referred to as "buckets"). The components of the content item service may operate to ensure that decrypted media provided by givers for content items is stored in a separate logical data container than corresponding encrypted media and, generally, that decrypted media is stored in a different logical data container than encrypted media.

Having received and successfully processed the put request received from the transcoding workflow service 316, the data storage service 306 may transmit an acknowledgement in response to the put request that it received. Having received acknowledgement of successful fulfillment of the put request transmitted to the data storage service 306, the transcoding workflow service 316 may transmit a request to transcode decrypted media to the transcoding service 318. The request to transcode the decrypted media may specify as a parameter of the request a location (or multiple locations) of the decrypted media in the data storage service 306. In other embodiments, the location (or locations) may be created so as to be determinable by the transcoding workflow service 316 without having receiving the location (or locations) explicitly from the transcoding service. For example, the transcoding workflow service 316 and the transcoding service 318 may be configured (e.g., with programming logic) to perform the same algorithm for determining the location(s).

The data storage location for an instance of transcoded media content, in this example, is indicated as MediaKey. In some embodiments, the MediaKey is determined based at least in part on the MediaID and information identifying the giver of the content item (e.g., a customer identifier). For example, in embodiments where the MediaID is a URL, the MediaKey may comprise the identifying information (e.g., customer identifier, Internet Protocol (IP) address, and/or other information) prepended to the MediaID with a slash delimiter ("/") separating the identifying information and the MediaID. Note that, while various embodiments, use a separate MediaKey and MediaID, the MediaID or MediaKey can be used without the other being used since one is derivable from the other. To fulfill the request to transcode the decrypted media, the transcoding service 318 may use the MediaKey to transmit a request to get the decrypted media from the data storage service 306. The data storage service 306 may fulfill the request to get the decrypted media by translating the decrypted media to the transcoding service 318. Once the transcoding service 318 has obtained the decrypted media from the data storage service 306, the transcoding service 318 may transcode 604 the decrypted media to generate one or more transcoded media files. As discussed above, transcoding may include converting to a different file format, converting to a different resolution (e.g., pixels per unit area and/or framerate), altering one or more characteristics of the media such as color, sound and/or the like. The transcoded media files may be transmitted to the data storage service 306 by way of a put request transmitted from the transcoding service to the data storage service 306.

The data storage service having successfully fulfilled the request to store the transcoded media files may transmit to the transcoding service 318 one or more acknowledgements. It should be noted that the way by which the transcoded media files are stored may vary in accordance with various embodiments. In some examples, each transcoded media file is stored separately in the data store service and a separate put request is used for each media file. In other examples, the transcoded media files are stored in a single data object of the data storage service and thus all the transcoded media files for the associated content item have the same identifier in the data storage service 306. Similarly, when separate requests are used for different transmitted media files, each transmitted media file may have a separate identifier in the data storage service 306 to enable more efficient retrieval of one of several transcoded media files.

Once transcoding service 318 receives one or more acknowledgements from the data storage service 306, the transcoding service may notify 606 of completion of transcoding. The notification may be transmitted directly or indirectly to the transcoding workflow service 316. In some examples, transcoding service 318 transmits a notification to a notification service. A queuing service may subscribe to a topic to which the notification is published. Upon receipt of the notification by the notification service, the queuing service may add an item corresponding to the content item associated with the transcoded media into a queue. Other ways of notification may also be performed such as by transmitting its message directly to the transcoding workflow service. With a queue, however, the transcoding workflow service may consume items in the queue in the order in which they are completed, in the case that the transcoding is performed faster than can be processed by the transcoding workflow service. Other variations are also considered as being within the scope of the present disclosure.

Once the transcoding workflow service has been directly or indirectly notified of completion of the transcoding by the transcoding service 318, the transcoding workflow service 316 may submit a request to the data storage service to get the transcoded files. In some examples, the transcoding service transmits a request to the data storage service to replace the decrypted media with the transcoded media and therefore the same identifier is usable by the transcoding workflow service 316 to obtain the transcoded files. In other examples, different identifiers are used for the transcoded media files and the notification of completion may indicate a storage location to be used by the transcoding workflow service 316 to request the transcoded files from the data storage service 306. Regardless of how performed, the transcoding workflow service may receive the transcoded files from the data storage service 306. The transcoding workflow service 316 may obtain 608 an encryption key to be used to encrypt the transcoded media files. In some examples, the transcoding workflow service uses the symmetric cryptographic key described above for encryption of the transcoded media files and stores an encrypted version of the symmetric cryptographic key with the encrypted transcoded media files. In other examples, a different cryptographic key is used.

In some embodiments, the transcoding workflow service 316 obtains the encryption key by transmitting the request to the key management system described above or another key management system. The key management system may provide a public key or a public/private key pair and a public key version usable to identify the corresponding private key at a later time. A symmetric cryptographic key may be used to encrypt the transcoded media files and a public key received from the key management system may be used to encrypt the symmetric cryptographic key (i.e., the encryption key). Other variations are also considered as being within the scope of the present disclosure. In any event, when the encryption key has been obtained 608, the transcoded files may be encrypted 610. The encrypted files may be stored in the data storage service 306 by submission of a put request from the transcoding workflow service 316 to the data storage service 306. The data storage service may provide in response one or more acknowledgements. As noted above, the encrypted transcoded media files may be stored in a single data object and therefore a single acknowledgement may be transmitted from the data storage service 306 to the transcoding workflow service 316. In other examples, separate put requests are used for different encrypted transcoded media files and corresponding acknowledgements are provided to each of those requests. The location for the encrypted files may be the same location as the giver uploaded to. In some embodiments, the location(s) for the encrypted files is different from, but based at least in part on the location that the encrypted media was uploaded to, such as by appending information to a URL, such as information indicating the contents of the location. Generally, the location for the encrypted files may be based at least in part on output of a pre-image resistant function, based at least in part on the same or a different location to which the giver uploaded the encrypted media.

Other variations are also considered as being within the scope of the present disclosure. For example, in some examples, the data storage service supports requestor-supplied cryptographic keys such that, unencrypted data may be provided to the data storage service and the data storage service may perform server-side encryption. Techniques for such request-supplied keys are described in U.S. application Ser. No. 14/037,282, entitled "RESOURCE LOCATORS WITH KEYS," filed on Sep. 25, 2013 and U.S. application Ser. No. 14/037,292, entitled "DATA SECURITY USING REQUEST-SUPPLIED KEYS," filed on Sep. 25, 2013, which are incorporated herein by reference. In such examples, a public key may be provided to the data storage service for the data storage service. The data storage service may use a symmetric cryptographic key (which may be generated by the data storage service) to encrypt the data and the public key to encrypt the symmetric cryptographic key. Other variations, such as where the transcoding workflow service supplies the symmetric cryptographic key and the public key to the data storage service for use thereby are also considered as being within the scope of the present disclosure.

The identifier for the encrypted media file(s) stored by the data storage service may be determined such as described above, e.g., based at least in part on output of a pre-image resistant function. In some examples, the identifier for the encrypted media file(s) is based at least in part on the identifier used above, e.g., by appending information to the URL that was determined, such as a username of the giver of the content item or other information.

Once the encrypted transcoded media files have been successfully stored in the data storage service 306, the transcoding workflow service 316 may transmit a request to the data storage service 306 to delete the decrypted transcoded files that were stored temporarily in the data storage service 306 by the transcoding service 318. In this manner, the decrypted media content is not persistently stored longer than necessary thereby increasing security of the system and generally of the information in the media files. One or more acknowledgements may be transmitted from the data storage service 306 to the transcoding workflow service upon deletion. Note that if the transcoded files are stored in a different storage location of the data storage service 306, multiple deletion requests may be transmitted from the transcoding workflow service 316 to the data storage service 306. Accordingly, multiple acknowledgements may be transmitted from the data storage service 306 to the transcoding workflow service 316.

Once appropriate acknowledgements have been received from the data storage service 306, the transcoding workflow service may update 612 a content delivery service, such as by transmitting a content item identifier and access token (discussed below) to the content delivery service. The content delivery service may be a service configured to provide a notification to a receiver of the content item produced as part of performance of operations illustrated in FIG. 6 and other figures described above. The content delivery service may, for example, transmit an electronic mail message to an electronic mail account associated with the receiver or the electronic mail message may have been specified by the giver. Other ways of notifying the receiver may be used such as by a post on a social network, push notification, a short message service (SMS) message to a telephone number associated with the receiver and/or otherwise. Once a content item has been created, the content item may be redeemed by a receiver associated with the content item, which may be a person specified by the giver during creation of the content item.

Figure 7:
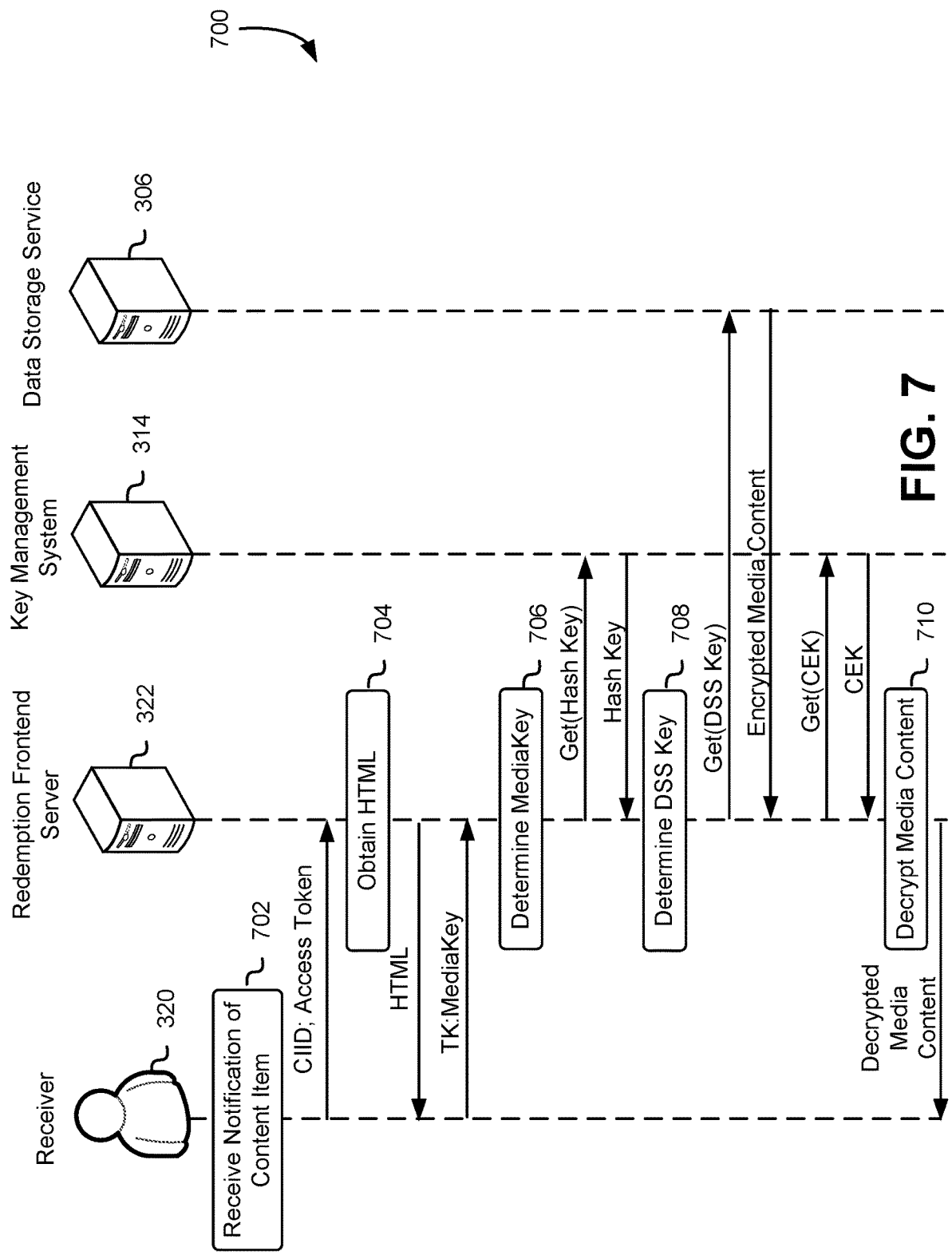
FIG. 7 shows a diagram illustrating communications between various entities involved in redemption of a content item in accordance with an embodiment.

FIG. 7 shows a diagram 700 illustrating communications between various systems involved in the redemption of a content item by a receiver 320. As with the giver described above, communications described as being to and from the receiver are between a device associated with the receiver 320 and another system. Generally, unless otherwise clear from context, operations described as being performed by the receiver 320 are performed by a device associated with the receiver 320.

Turning to the specifics of FIG. 7, in an embodiment, the receiver 320 receives 702 notification of a content item. As described above, an electronic message may be transmitted to the receiver 320. To redeem the content item, the receiver 320 may transmit a request for the content item which includes a content item identifier (CIID) and an access token provided in the notification. In some embodiments, the content item identifier and access token is encoded in a URL that is embedded in HTML code generated for the content item such that a browser or other application of the receiver 320 uses the URL to transmit a request that encodes the access token. The access token may be provided from the receiver 320 to a redemption frontend server 322 which may be a component of the redemption frontend 204 of the content item service 200 described above in connection with FIG. 2. In an embodiment, the content item identifier is an identifier of a content item that has been created. The access token, in an embodiment, is a code (e.g., a random number) that is generated and stored in association with the content item identifier. For instance, in some embodiments, when content transcoding for a content item is completed, the transcoding workflow service causes the content delivery service to store the access token and the content item identifier in association with one another (e.g., in a database). The transcoding workflow service, the content delivery service, or another service may generate one or both of the content item identifier and access token. The content item identifier and access token may also be stored in association with information usable to obtain data for the content item, such as the MediaID and/or MediaKey.

The redemption frontend server 322 may use the access token it received to obtain 704 HTML code which may then be provided from the redemption frontend server 322 to the receiver 320. In some embodiments, the redemption frontend server 322 transmits the content item identifier and access token to the content delivery service. The content delivery service may verify (e.g., using a database lookup) that the content item identifier and the access token match and, as a result of a match, render HTML code that is then provided to the redemption frontend server 322 for providing to the receiver 320. Having received the HTML code from the redemption frontend server 322, receiver 320 may transmit a media key token to the redemption frontend server 322. The media key token may be encrypted information where the information includes the media key such as described above.

The redemption frontend server 322 may use the media key token to determine 706 the media key. In some embodiments, the redemption frontend server decrypts the media key token to determine 706 the media key. In other embodiments, the redemption frontend server 322 transmits the media key token to another service that is operable to decrypt the media key token and to provide the media key in response. The redemption frontend server 322 may transmit a request to the key management system 314 to obtain a hash key. The hash key may be received in response from the key management system 314. The redemption frontend server 322 may use the hash key received from the key management system 314 to determine 708 a data storage service key. The data storage service key in an embodiment is an identifier usable by the data storage service 306 to obtain from data storage data corresponding to the data storage service key. The data storage key may be, for example, an identifier out of the data object stored by the data storage service 306. In some embodiments, the redemption frontend server 322 determines the data storage service key by computing an HMAC of the hash key and the media key.

Other examples of determining the data storage service key include those described above including computation of other functions. Generally, the data storage service key may be determined in any manner consistent with which the data storage key was determined by the system that transmitted the encrypted media content to the data storage service 306 for storage such as the transcoding workflow service described above. The redemption frontend server 322 may transmit a request to get a data object corresponding to the data storage service key to the data storage service 306. The data storage service 306 may fulfill the request by providing encrypted media content identified by the data storage service key. The redemption frontend server 322 may transmit a request to the key management system 314 to get a content encryption key and the key management system 314 may fulfill the request by transmitting a content encryption key to the redemption frontend server 322.

In some embodiments, the encrypted media content includes an encrypted version of a cryptographic key used to generate the encrypted media content and the key management system 314 provides a key usable to decrypt that cryptographic key. In other examples, the encrypted key stored with the encrypted media content is provided to the key management system 314 and the key management system uses a local copy of another suitable cryptographic key to decrypt the content encryption key and provide the content encryption key to the redemption frontend server 322 to enable the redemption frontend server to decrypt the encrypted media content. Regardless of how the content encryption key is obtained, the redemption frontend server 322 may decrypt 710 the encrypted media content to generate decrypted media content. The decrypted media content may then be provided to the receiver 320. For example, the decrypted media content may be streamed to the receiver 320 for the receiver 320 to consume the decrypted media content on an associated device.

As with all operations described herein, variations are considered as being within the scope of the present disclosure. For example, FIG. 7 shows various operations performed by the redemption frontend server 322. In some embodiments, operations described in FIG. 7 as being performed by the redemption frontend server 322 are performed by different servers. For example, the access token may be provided to a different server than the servers that perform remaining operations described in connection with FIG. 7. As another example of a variation considered as being within the scope of the present disclosure, in some embodiments, the data storage service decrypts the content before providing to the redemption frontend server. Other variations are also considered as being within the scope of the present disclosure.

As another example of a variation considered as being within the scope of the present disclosure, encryption and decryption may be performed by different components than described above and illustrated in the figures. For instance, in some embodiments, the transcoding service is configured to perform encryption and decryption and, as a result, media does not need to be temporarily stored in the data storage service temporarily for the transcoding service.

In addition to the foregoing, the above discussion focuses on transcoding as a programmatic operation that can be performed on media content. The scope of the present disclosure extends to other programmatic operations instead of or in addition to transcoding. For instance, data compression, document/content validation, content detection (e.g., using machine learning in connection with manual review to identify sexually explicit content or, generally, content that violates one or more terms of service) are also considered as being within the scope of the present disclosure. Generally, operations on content may include operations that transform the content and/or operations that are not transformative. As with transcoding, performance of an operation on content may be manual (i.e., requiring at least some human-user input into an input device), automated, or a combination thereof (hybrid).

In addition, a system employing the various techniques described above may have additional features and modes of operation different from those discussed above. In some examples, givers of content items are able to select privacy settings and, in some embodiments, specify that media content be publicly available. For such media content, the content item service may provide for a mode of operation where the giver uploads the media content without encrypting the media content (except, perhaps, as part of an SSL/TLS or other secure session). The content item service may, therefore, avoid decryption and re-encryption of the media content or may perform operations in different ways, such as by using a different cryptographic key, a different cryptographic algorithm, and/or utilizing server-side encryption for the upload.

As discussed, numerous variations utilize symmetric and/or asymmetric cryptographic primitives. Symmetric cryptographic key algorithms may include various schemes for performing cryptographic operations on data including block ciphers, stream ciphers and digital signature schemes. Example symmetric cryptographic key algorithms include the advanced encryption standard (AES), the data encryption standard (DES), triple DES (3DES), Serpent, Twofish, blowfish, CAST5, RC4 and the international data encryption algorithm (IDEA). Symmetric cryptographic key algorithms may also include those used to generate output of one way functions and include algorithms that utilize hash-based message authentication codes (HMACs), message authentication codes (MACs) in general, PBKDF2 and Bcrypt. Asymmetric cryptographic key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 8:
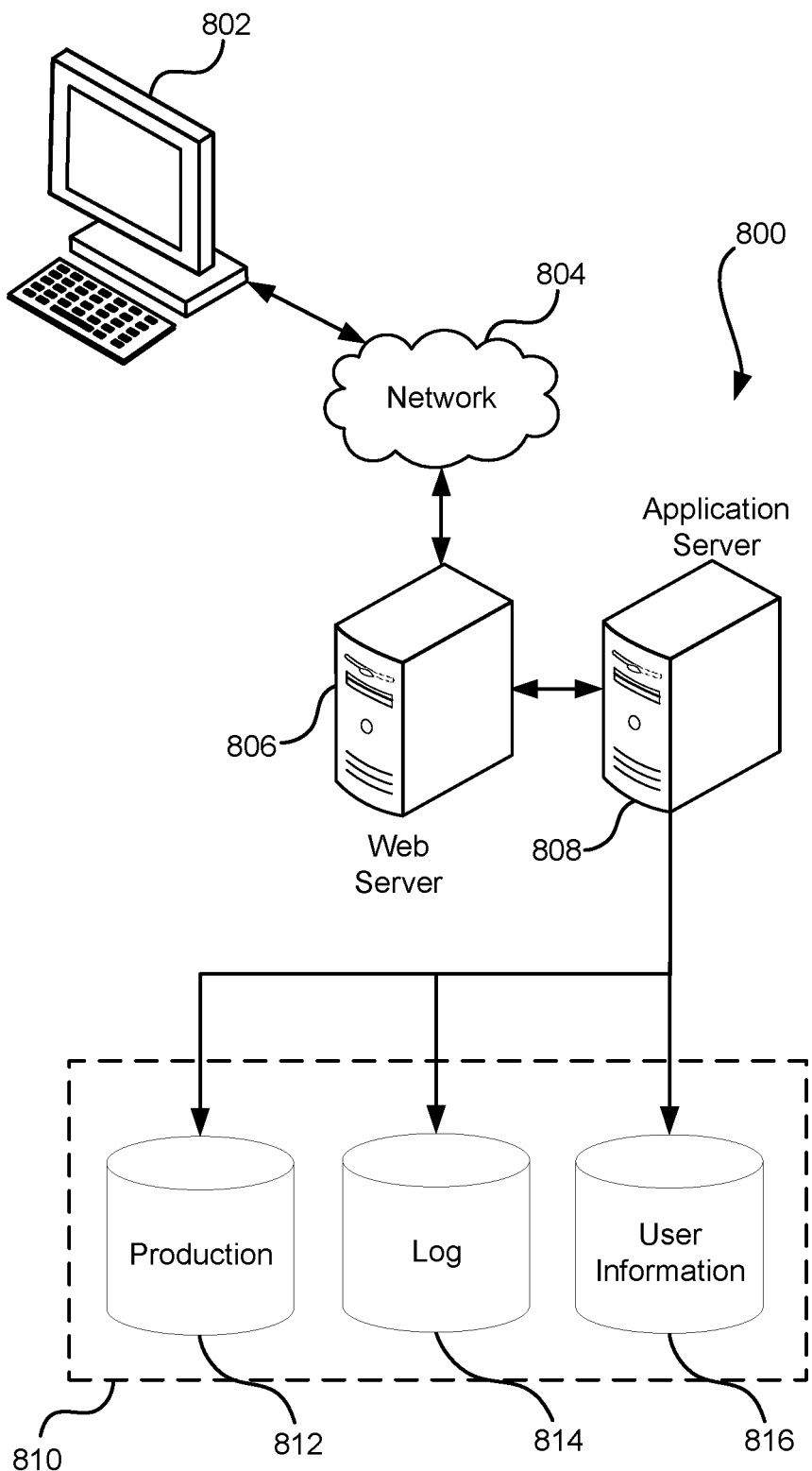
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to create a content item, the request including identifying information associated with a giver of the content item;
   providing a response to the request including a cryptographic key and information identifying a data storage location, the response, upon receipt by a first computer system operated by the giver, causing the first computer system to encrypt media with the cryptographic key to generate encrypted media and provide the encrypted media to the data storage location;
   in response to the encrypted media being stored in the data storage location, causing a transcoding service computer system to:
      decrypt the encrypted media to generate the media using the cryptographic key;
      transcode the media to generated transcoded media; and
      transmit a notification that the transcoded media is stored in the data storage location;
   in response to receiving the notification, encrypting the transcoded media with a second cryptographic key to generate encrypted transcoded media; and
   updating a content delivery service with an identifier of the encrypted transcoded media and an access token associated with the encrypted transcoded media.

2. The computer-implemented method of claim 1, wherein the information identifying the data storage location further includes a pre-signed uniform resource identifier.

3. The computer-implemented method of claim 1, wherein the access token further comprises encrypted information useable to generate the identifier of the encrypted transcoded media.

4. The computer-implemented method of claim 1, wherein the encrypted transcoded media is generated by a data storage service providing the data storage location.

5. The computer-implemented method of claim 1, wherein the identifier of the encrypted transcoded media is generated as a result of applying a hash function to the encrypted transcoded media.

6. The computer-implemented method of claim 1, wherein the computer-implemented method further comprises, in response to updating the content delivery service, causing the content delivery service to provide, to a receiver device, the access token.

7. A system, comprising:
   one or more processors; and
   memory that stores computer-executable instructions that, as a result of being executed, cause the one or more processors to:
      in response to a request to create a content item, provide information that can be used by a giver computer system to obtain a key to encrypt a media object and identify a storage location for an encrypted media object generated as a result of encrypting the media object with the key;

receive an indication that the encrypted media object is stored in the storage location;

cause the encrypted media object to be transcoded to generate a transcoded media object by at least decrypting the encrypted media object and applying a transformation to a result of decrypting the encrypted media object;

cause the transcoded media object to be encrypted with a second key to generate an encrypted transcoded media object; and generate an identifier of the encrypted transcoded media object and a token useable to obtain the identifier of the encrypted transcoded media object.

8. The system of claim 7, wherein the memory further includes instructions that, as a result of being executed, cause the one or more processors to provide the token to a computer system associated with a receiver of the content item.

9. The system of claim 7, wherein the request further comprises a ReserveMediaUpload (RMU) request.

10. The system of claim 7, wherein the instructions that cause the system to provide the key further comprise instructions that, as a result of being executed, cause the one or more processors to provide the key encrypted with a public key associated with a giver of the content item.

11. The system of claim 7, wherein the instructions that cause the system to decrypt the encrypted media object further comprise instructions that, as a result of being executed, cause the one or more processors to decrypt the key with a private key prior to decrypting the encrypted media object.

12. The system of claim 7, wherein the memory further includes instructions that, as a result of being executed, cause the one or more processors to update a content delivery service by at least:

causing the encrypted transcoded media object to be stored in a data storage service such that the encrypted transcoded media object can be obtained based at least in part on the identifier;

providing the content delivery service with the token; and causing the data storage service to delete the transcoded media object.

13. The system of claim 7, wherein the memory further includes instructions that, as a result of being executed, cause the one or more processors to generate the response to the request by at least determining a data storage service, a pre-signed universal resource identifier, a symmetric cryptographic key to use as the key, a public key, or a public key version number to include in the response.

14. A non-transitory computer-readable storage medium storing thereon executable instructions that, as a result of being executed by one or more processors of a computer system, cause the computer system to at least:

receive, from a giver computer system, a request to create content for a receiver computer system;

provide, in response to the request, information useable by the giver computer system to generate a cryptographic key;

determine that media associated with the content is stored in a location;

cause the media to be decrypted using the cryptographic key;

transcode the media to generate transformed media;

generate encrypted transformed media by at least encrypting the transformed media with the cryptographic key; and cause an access token to be provided to the receiver computer system, the access token useable to obtain the content including the transformed media.

15. The non-transitory computer-readable storage medium of claim 14, wherein the instructions that cause the computer system to cause the access token to be provided to the receiver computer system further include instructions that cause the computer system to update a content delivery service with an identifier of a result of encrypting the transformed media with the cryptographic key.

16. The non-transitory computer-readable storage medium of claim 15, wherein the instructions further comprise instructions that, as a result of being executed by the one or more processors, cause the computer system to generate the access token based at least in part on applying a pre-image resistant function to the result of encrypting the transformed media with the cryptographic key to generate the identifier.

17. The non-transitory computer-readable storage medium of claim 14, wherein the information useable by the giver computer system to generate the cryptographic key further comprises a pre-signed uniform resource identifier that encodes a second request to upload the media.

18. The non-transitory computer-readable storage medium of claim 14, wherein the content further comprises audio and video content.

19. The non-transitory computer-readable storage medium of claim 14, wherein the instructions further comprise instructions that, as a result of being executed by the one or more processors, cause the computer system to:

receive a second request to redeem the content, the second request including the access token;

provide a response to the request by at least:

decrypting the access token to generate an identifier of the transformed media; and obtaining the encrypted transformed media based at least in part on the identifier, the encrypted transformed media generated as a result of encrypting the transformed media with the cryptographic key; and provide the transformed media in response to the second request by at least decrypting the result with the cryptographic key.

20. The non-transitory computer-readable storage medium of claim 14, wherein the request further comprises a ReserveMediaUpload (RMU) request.

* * * * *